Feb. 20, 1951                    C. A. KING                    2,542,253
                              FISHING ROD HOLDER
                              Filed Oct. 7, 1946
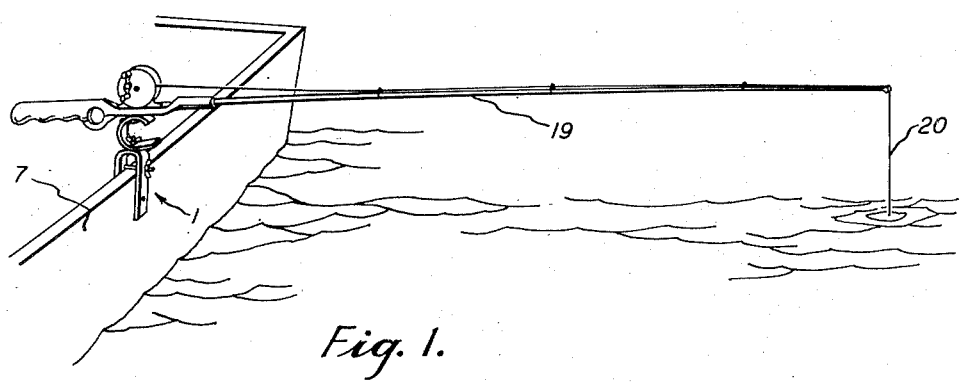
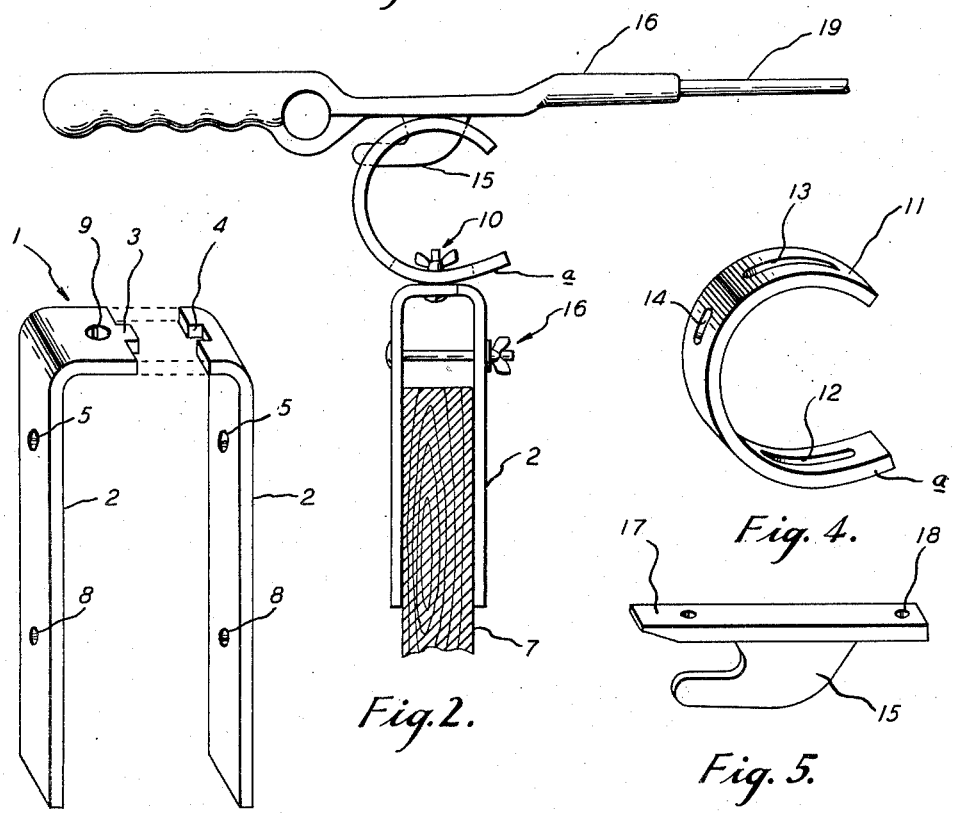
CLARENCE A. KING
            INVENTOR
BY  *Herbert J. Brown*
                ATTORNEY Patented Feb. 20, 1951

2,542,253

UNITED STATES PATENT OFFICE 2,542,253

FISHING ROD HOLDER

Clarence A. King, Fort Worth, Tex.

Application October 7, 1946, Serial No. 701,731

1 Claim. (Cl. 248—42)

This invention relates to fishing equipment and has reference to a holder for a rod and reel.

An object of the invention is to provide a holder for preventing loss of or damage to the supported rod and reel when the same is used for trolling or still fishing.

Another object of the invention is to provide a holder of the referred to class which is locked in position against downward or lateral forces at the end of the rod.

Another object of the invention is to provide a holder from which the rod and reel may be quickly removed, but only when the rod is positioned in an upward angle.

A further object of the invention is to provide a holder which tends to tilt upwardly when lateral forces are applied to the end of the rod, which action thus tends to set the hook in the fish being caught.

A further object of the invention is to provide a holder of the described class which may be readily adapted to the side of a boat, on a driven stake or other convenient place for still fishing or trolling.

These and other objects will become apparent from the following description of the accompanying drawing of an exemplary form of the invention, wherein:

Figure 1 is a perspective view of a part of a boat and showing the present invention positioned thereon and supporting a rod and reel.

Figure 2 is a side elevational view of the present holder supporting a rod handle.

Figure 3 is an expanded perspective view of the clamp portion of the present holder.

Figure 4 is a perspective view of the circular holder forming a part of the present invention, and Figure 5 is a perspective view of a hook for engaging the upper portion of the holder illustrated in Figure 4 and is a modified form of the invention whereby the present device may be adapted to conventional rod handles.

Accordingly, the invention includes a clamp 1 which, in assembly, is in the form of an inverted U. The clamp sides 2 are joined by a tongue 3 and grooves 4, respectively, as particularly shown in Figure 3 at the transverse portion. The clamp 1 also includes upper opposing holes 5 in the sides 2 to receive a bolt and wing nut assembly 6 therethrough for attaching the said clamp to some stationary support, such as the side of a boat 7. As will be noted in Figure 3, other opposing holes 8 are provided in the lower portions of the sides 2 for permanently attaching the clamp 1 in place, when desired.

One of the transverse portions of the sides 2 includes an opening 9 therethrough to receive another wing nut and bolt assembly 10 as shown in Figure 2. The last referred to wing nut assembly 10 engages a circular holder 11 atop the clamp assembly 1 and is engaged thereon by means of an arcuate slot 12 in the wall of the said holder. The latter provides for angular adjustment of the holder 11. The lower end of the holder 11 extends laterally, as at $a$, to prevent the said holder from turning during operation. Thus, the extending portion $a$, or heel, may be in contact with the transverse portion of the clamp assembly 1 to not only prevent rotation, but to relieve the strain on the wing nut assembly 10. The holder 11 includes other slots 13 and 14 in its upper portion to receive a hook 15 which is attached to or is a part of a rod handle 16. As shown in Figures 2 and 5, the hook 15 depends from the handle 16 and has its end portion substantially parallel with the length of the said handle, and disposed toward the rear end thereof. The outer portion of the angle thus formed in the hook 15 is arcuate for reasons hereinafter referred to in the description of operation. The base portion of the hook 15, in assembly, is engaged in the uppermost slot 13 of the holder 11, whereas the outer portion of the said hook is engaged in the adjacent slot 14.

As shown in Figure 2, the other portion 15 is an integral part of the handle 16, but in Figure 5, a modified form of the invention, the hook 15 is provided with an integral elongated upper portion 17 whereby the same may be attached to a conventional rod handle (not shown) by means of the sliding rings thereon, or by means of screws positioned through holes 18 in the said elongated portions.

In operation, the rod handle 16 is positioned in the holder 11, as shown in Figure 2, and having the clamp assembly 1 secured to a stationary support 7. The rod 19 is positioned over the water and the outer end of the line 20 is in the water as shown in Figure 1. A fish pulling on the end of the line 20 and away from the boat 7 would tend to cause the rod 19 to tilt upwardly, by reason of the arcuate shape of the hook 15 and its engagement in the holder slots 13 and 14, and thus set the hook in the fish. By reason of the described arrangement, the handle 16 cannot be removed from the holder 11 until the rod 19 is tilted upwardly at a substantial angle. Thus, the rod is necessarily positioned at the proper angle for reeling in the fish before the handle 16 can be removed from the holder 11.

What is claimed is:

A holder for a fishing rod having a hook mounted on the handle thereof, said holder comprising an arcuate member having a pair of spaced slots therein, one of said slots being adapted to receive said hook inwardly therethrough, and the other of said slots adapted to receive said hook outwardly therethrough, a supporting clamp, a longitudinal slot in said arcuate member, and a bolt projecting through said clamp and received within said horizontal slot whereby said arcuate member may be partially rotated about its center and selectively secured in place.

CLARENCE A. KING.

REFERENCES CITED

The following references are of record in the file of this patent:

UNITED STATES PATENTS

| Number | Name | Date |
| --- | --- | --- |
| D. 136,856 | Olowecki | Dec. 14, 1943 |
| 2,184,192 | McCline | Dec. 19, 1939 |
| 2,273,492 | Malmer | Feb. 17, 1942 |
| 2,311,823 | Gaskill | Feb. 23, 1943 |